(12) United States Patent
Iwanari

(10) Patent No.: US 11,183,191 B2
(45) Date of Patent: Nov. 23, 2021

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Mami Iwanari, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 239 days.

(21) Appl. No.: 16/667,952

(22) Filed: Oct. 30, 2019

(65) Prior Publication Data
US 2020/0402503 A1 Dec. 24, 2020

(30) Foreign Application Priority Data

Jun. 24, 2019 (JP) .............................. JP2019-116595

(51) Int. Cl.
| | | |
|---|---|---|
| G06K 9/72 | (2006.01) |
| G10L 15/22 | (2006.01) |
| G10L 15/26 | (2006.01) |
| G10L 15/30 | (2013.01) |
| G06F 3/16 | (2006.01) |
| G10L 15/18 | (2013.01) |
| G06F 40/232 | (2020.01) |

(Continued)

(52) U.S. Cl.
CPC .............. *G10L 15/22* (2013.01); *G06F 3/167* (2013.01); *G06F 40/232* (2020.01); *G06K 9/00442* (2013.01); *G06K 9/03* (2013.01); *G10L 15/1815* (2013.01); *G10L 15/26* (2013.01); *G10L 15/30* (2013.01); *G06K 9/6821* (2013.01); *G06K 9/72* (2013.01); *G06K 2209/01* (2013.01); *G10L 2015/223* (2013.01)

(58) Field of Classification Search
CPC ......... G10L 15/22; G10L 15/26; G10L 15/30; G10L 15/1815; G10L 2015/223; G06K 9/00442; G06K 9/03; G06K 2209/01; G06K 9/72; G06K 9/6821; G06F 40/232; G06F 3/167
USPC ........................................................ 382/229
See application file for complete search history.

(56) References Cited

U.S. PATENT DOCUMENTS

| | | | | |
|---|---|---|---|---|
| 5,305,396 | A | * | 4/1994 | Betts ...................... G06K 9/033 |
| | | | | 382/175 |
| 5,329,598 | A | * | 7/1994 | Geist ....................... G06K 9/03 |
| | | | | 382/186 |

(Continued)

FOREIGN PATENT DOCUMENTS

JP 2011-107820 A 6/2011

*Primary Examiner* — Charlotte M Baker
(74) *Attorney, Agent, or Firm* — Oliff PLC

(57) ABSTRACT

An information processing apparatus includes a processor. The processor is configured to identify, from a character string recognition result for a form, a form feature that indicates at least a field in which the form is used or an attribute of a filling-out person filling out the form, accumulate past correction tendencies for character string recognition results for forms having respective identified form features, and obtain a correction tendency for a form having a form feature that is the same as the identified form feature from among the accumulated correction tendencies, and perform control to display a candidate correct expression for the character string recognition result for the form in accordance with the obtained correction tendency.

20 Claims, 10 Drawing Sheets

(51) Int. Cl.
    *G06K 9/00*     (2006.01)
    *G06K 9/03*     (2006.01)
    *G06K 9/68*     (2006.01)

(56) References Cited

U.S. PATENT DOCUMENTS

| | | | |
|---|---|---|---|
| 2008/0159635 A1* | 7/2008 | Lapstun | G06F 3/03546 382/229 |
| 2015/0264269 A1* | 9/2015 | Yuan | H04N 5/2256 348/241 |

\* cited by examiner

FIG. 3

| DICTIONARY NAME | FORM TYPE | RECOGNIZED BOX POSITION | RECOGNIZED BOX TYPE | PRESENCE OF CORRECTION | CHARACTER STRING BEFORE CORRECTION | CHARACTER STRING AFTER CORRECTION |
|---|---|---|---|---|---|---|
| GENERAL | QUARTERLY REPORT | BOX NO. 9 | APPROVAL CONDITION | YES | 来期来してな改修 「来」"KI-RAI" | 期末、には 「末」"KI-MATSU" |
| MEDICAL | SURGERY CERTIFICATE | BOX NO. 3 | SURGERY PROCEDURE | YES | 右顧下線睡石除去手術 | 右顎、下腺、唾石 |
| GENERAL | APPLICATION | BOX NO. 5 | QUESTIONNAIRE | YES | 単悟を用糸氏に書く | 単語、用紙 |
| ALPHANUMERIC | COMPONENT INSPECTION SHEET | BOX NO. 11 | COMPONENT NUMBER | YES | 289870 | ZB |

| DICTIONARY NAME | FORM TYPE | RECOGNIZED BOX POSITION | RECOGNIZED BOX TYPE | CANDIDATE CORRECT EXPRESSION | CATEGORY | CANDIDATE SELECTION REASON |
|---|---|---|---|---|---|---|
| GENERAL | QUARTERLY REPORT | BOX NO. 9 | APPROVAL CONDITION | 期末、末期、には、では、… "KI-MATSU", "MATSU-KI", "NI-HA", "DE-HA", … | HIGH CORRECTION FREQUENCY | • WORDS HAVING HIGH CORRECTION FREQUENCY.<br>• BE CAREFUL ABOUT A BREAK BETWEEN WORDS.<br>• ERRONEOUS READING OF POST POSITIONAL PARTICLES HAVING HIGH CORRECTION FREQUENCY. |
| MEDICAL | SURGERY CERTIFICATE | BOX NO. 3 | SURGERY PROCEDURE | 右顎、下膝、下膊、唾石、… "U-GAKU", SUITABLE "KA-SEN", "KA-TAN", "DA-SEKI", … | MEDICAL TERM | • KANJI CHARACTERS REPRESENTING BODY PARTS OR TERMS ARE LIKELY TO BE USED.<br>• FOR SURGERY PROCEDURES, LEFT-HAND RADICAL "TO-HEN" MIGHT BE UNSUITABLE, AND LEFT-HAND RADICAL "NIKUZUKI" IS HIGHLY LIKELY TO BE SUITABLE. |
| GENERAL | APPLICATION | BOX NO. 5 | QUESTIONNAIRE | 単語、用紙、… CORRECT "TAN-GO", "YO-SHI", … | RADICAL/ DIFFICULT-TO-READ HANDWRITING | • A SIMPLIFIED FORM OF LEFT-HAND RADICAL "GON-BEN".<br>• A SIMPLIFIED FORM OF LEFT-HAND RADICAL "ITO-HEN". |
| ALPHANUMERIC | COMPONENT INSPECTION SHEET | BOX NO. 11 | COMPONENT NUMBER | ZB | CHARACTER STRING PATTERN | • COMPONENT NUMBERS SHOULD START WITH TWO ALPHABETICAL CHARACTERS. |

17

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-116595 filed Jun. 24, 2019.

BACKGROUND

(i) Technical Field

The present disclosure relates to an information processing apparatus and a non-transitory computer readable medium.

(ii) Related Art

A system for analyzing the details of a correction made by a user to the result of recognition of characters on a read form is available.

Japanese Unexamined Patent Application Publication No. 2011-107820 discloses a correction data analysis system that includes: a storage unit that stores therein correction data indicating the details of corrections made to business data in a business system and an analysis rule defined by a user; a correction data saving unit that obtains the correction data from the business system and stores the correction data in the storage unit; and a summarizing unit that summarizes the correction data stored in the storage unit on the basis of the analysis rule stored in the storage unit and creates summarization data.

SUMMARY

In a case where a newly read form includes a character string to which a correction has been made before, the details of the correction made to the character string is analyzed, and for the character string, a character string after correction is displayed as a candidate correct expression. When such an operation is performed, it is possible to assist a user who performs a check-correction operation.

However, different types of forms have different uses. In a case where frequently used character strings are different in the fields of uses, a character string that is used in one field might not be used in the other fields. Therefore, in a case where a candidate correct expression for a character string is displayed in accordance with only the similarity between the shapes of the character strings or past correction records for the form without identifying the use of the form, a candidate correct expression that is not suitable to the form for which a check-correction operation is ongoing may be displayed, and the check-correction target character string may be corrected to an unintended incorrect character string.

Aspects of non-limiting embodiments of the present disclosure relate to providing an information processing apparatus and a non-transitory computer readable medium which makes the accuracy of checking and correction by a user higher than in a case where a candidate correct expression is presented for the result of recognition of a character string in a form regardless of a form feature that indicates the field in which the form is used or attributes of a filling-out person filling out the form.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor. The processor is configured to identify, from a character string recognition result for a form, a form feature that indicates at least a field in which the form is used or an attribute of a filling-out person filling out the form, accumulate past correction tendencies for character string recognition results for forms having respective identified form features, and obtain a correction tendency for a form having a form feature that is the same as the identified form feature from among the accumulated correction tendencies, and perform control to display a candidate correct expression for the character string recognition result for the form in accordance with the obtained correction tendency.

BRIEF DESCRIPTION OF THE DRAWINGS

An exemplary embodiment of the present disclosure will be described in detail based on the following figures, wherein:

FIG. 3 is a diagram illustrating an example of a form feature table;

FIG. 4 is a diagram illustrating an example of a correction tendency table;

DETAILED DESCRIPTION

Figure 1:
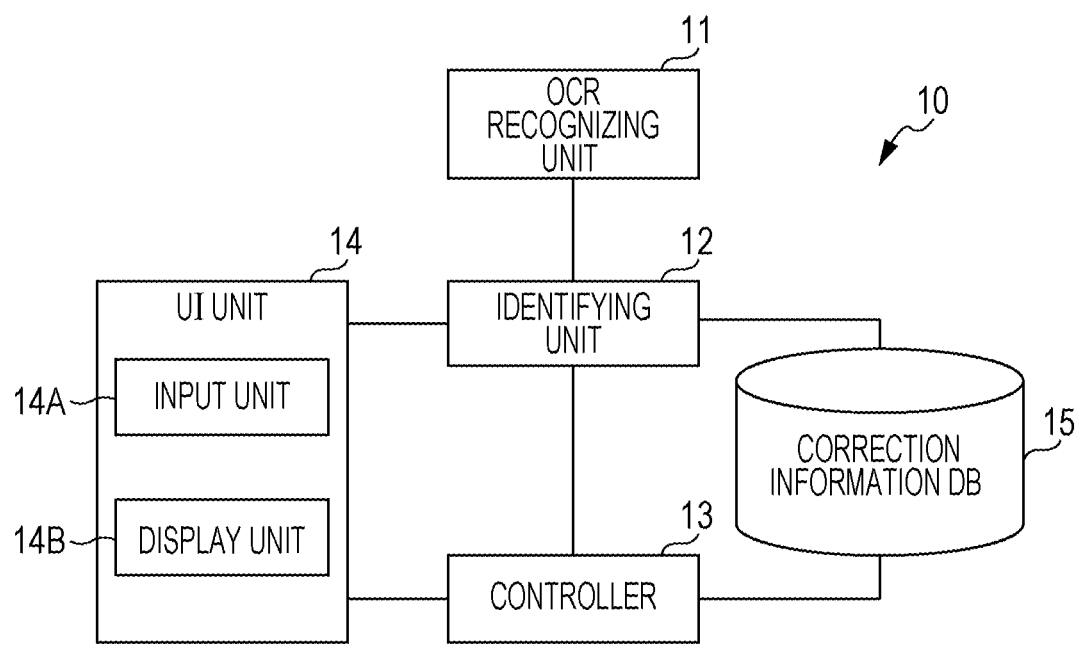
FIG. 1 is a block diagram illustrating an example functional configuration of an information processing apparatus.

Hereinafter, an exemplary embodiment of the present disclosure will be described with reference to the drawings. Note that components and steps having the same functions are assigned the same reference numerals throughout the drawings, and duplicated descriptions thereof will be omitted.

FIG. 1 is a block diagram illustrating an example functional configuration of an information processing apparatus 10. The information processing apparatus 10 receives an image of a form generated by, for example, a scanner optically reading the content of the form and prompts a checker of the form, the checker being an example of a user according to this exemplary embodiment, to check and correct the results of recognition of character strings read from the image of the form. As illustrated in FIG. 1, the information processing apparatus 10 includes an optical character recognition (OCR) recognizing unit 11, an identifying unit 12, a controller 13, a user interface (UI) unit 14, and a correction information database (DB) 15.

A "form" is a document that is used to record information about a specific matter in accordance with a predetermined format, and includes boxes, areas, and so on for a filling-out person to enter information for respective items. An "item" is a character string that indicates entered information, which is, for example, the address or name of the filling-out person. In a case where the filling-out person enters a character string in a box or the like, the character string may be handwritten or printed by, for example, a printer. The types of forms to be processed by the information processing apparatus 10 are not limited and may be an application form, a contract form, a medical form, and any other forms that are used by the filling-out person to enter some information.

An example case will be described below where a form includes boxes for respective items in which the filling-out person enters information and where the filling-out person enters, in a box associated with an item, information corresponding to the item in their handwriting. A box for an item in which the filling-out person enters information may be called "box corresponding to an item".

A "character string" described herein refers to a series of one or more characters. A character string formed of one character is specifically called "character".

In a form, in addition to character strings entered by the filling-out person, character strings, such as the names of items and the title of the form, printed in advance on the form are present.

The OCR recognizing unit 11 performs an OCR process for a received image of a form and sends the results of recognition of character strings obtained as a result of the OCR process, that is, character string recognition results, to the identifying unit 12.

Figure 2:
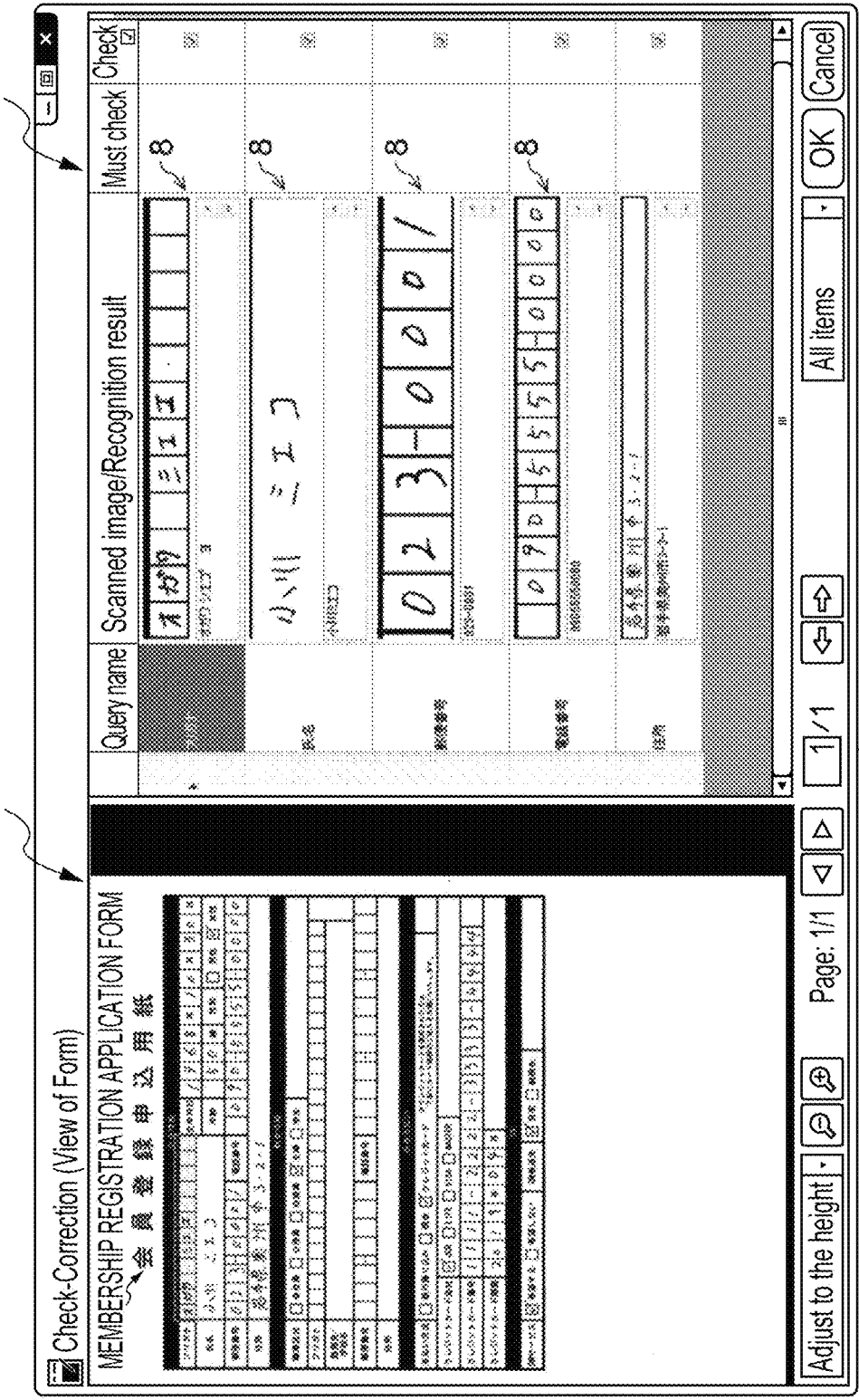
FIG. 2 is a diagram illustrating an example of a check-correction screen.

FIG. 2 is a diagram illustrating an example of a check-correction screen 2 on which an example image of a from received by the information processing apparatus 10 and character string recognition results obtained by the OCR recognizing unit 11 for the received image of the form are displayed.

The check-correction screen 2 is divided into, for example, two areas, namely, a form image area 4 and a check-correction area 6. In the form image area 4, the received image of the form is displayed. In the check-correction area 6, character string recognition results for the received image of the form are displayed. The check-correction screen 2 in FIG. 2 illustrates an example case of receiving a membership registration application form for some membership registration.

The OCR recognizing unit 11 recognizes character strings entered by the filling-out person for the respective items of the form, and character string recognition results obtained by the OCR recognizing unit 11 are displayed in the check-correction area 6 for the respective items of the form.

The check-correction area 6 includes a query name column in which the items of the form are displayed and scanned image/recognition result columns 8 in each of which an image of a character string in a box corresponding to the item and a character string recognition result obtained by the OCR recognizing unit 11 from the image of the character string in the box are displayed. The scanned image/recognition result columns 8 each include two rows, namely, an upper row and a lower row. In the example of the check-correction screen 2 in FIG. 2, an image of a character string in a box corresponding to the item is displayed in the upper row, and a character string recognition result obtained by the OCR recognizing unit 11 from the image of the character string displayed in the upper row is displayed in the lower row. As a matter of course, the display position of an image of a character string in a box and the display position of the character string recognition result are not limited, and an image of a character string in a box may be displayed in the lower row, and the character string recognition result may be displayed in the upper row.

The scanned image/recognition result columns 8 are each used to not only display an image of a character string in a box and the character string recognition result but also check and correct the character string recognition result as described below.

When receiving character string recognition results for a form from the OCR recognizing unit 11, the identifying unit 12 analyzes the character string recognition results for the form by using an existing natural language analysis technique and identifies a form feature described below.

A "form feature" refers to general features of a form obtained from character string recognition results for the form and includes at least either features of information entered on the received form or features of the filling-out person filling out the form.

Features of information entered in a form are features of the form inferred from the format of the form or the entered information and specifically include the field in which the form is used, the arrangement of boxes corresponding to the items, the type of information entered in each box, and so on. The type of information entered in a box represents the result of categorization of the entered character string in terms of the content and indicates, for example, that the entered information is an answer to a questionnaire or the entered information is a component number indicating the type of component.

Features of the filling-out person filling out a form are general attributes of the filling-out person entering character strings in the form and include, for example, the name of the filling-out person filling out the form, the occupation of the filling-out person, the place of residence of the filling-out person, the age of the filling-out person, and a group to which the filling-out person belongs (for example, a jogger club). Features of the filling-out person filling out a form are identified from character string recognition results for the form. For example, in a case where the form includes a box for entering the address of the filling-out person, the identifying unit 12 identifies the place of residence of the filling-out person from the result of recognition of a character string in a box corresponding to the address. Accordingly, the identifying unit 12 needs to identify features of the filling-out person filling out a form from the results of recognition of character strings in boxes corresponding to items in which features of the filling-out person filling out the form are entered.

The method for identifying the form feature is not limited to the above-described method. For example, the checker of the form may use the UI unit 14 described below to input features of information entered in the form or features of the filling-out person filling out the form. In a case where items for which information about features of the filling-out person filling out the form is entered are not present in the form, the features including the age, the sex, the occupation, and the place of residence of the filling-out person filling out the form may be identified from, for example, a handwritten character string entered in a box, the content, and the wording of the text.

The identifying unit 12 receives, from the checker of the form, a correction instruction for a character string recognition result for the form via the UI unit 14 described below and identifies a correction tendency regarding the character string recognition result for the form.

Specifically, the identifying unit 12 associates the character string before correction with the character string after correction and identifies a correction tendency regarding the character string recognition result for the form by using an existing data analysis technique. As an existing data analysis technique, for example, machine learning or deep learning using artificial intelligence (AI) as well as clustering or frequency analysis is used.

A correction tendency regarding a character string recognition result for a form (hereinafter referred to as "form correction tendency") is information indicating, in a case where the correction is recognized to have a statistically significant difference from the other corrections of character strings, what significant difference is recognized for the correction.

A form correction tendency includes, for example, a candidate correct expression for the character string, a candidate selection reason, which is the reason for selecting a character string as the candidate correct expression, and the category of the candidate selection reason.

The candidate correct expression for the character string includes, for example, a character string after correction obtained after correction by the checker of the form and a character string that is inferred from an identified correction tendency and that is likely to be used as a character string after correction.

The candidate selection reason, which is the reason for selecting a character string, includes reasons for displaying the character string as the candidate correct expression and, for example, includes information indicating that the candidate correct expression is a character string that is likely to be used as a specialist term used in a specific field or information indicating that the candidate correct expression is a character string having correction frequency higher than that of the other character strings.

The category of the candidate selection reason includes information indicating a summary of the candidate selection reason.

The identifying unit 12 sends the identified form feature and correction tendency to the correction information DB 15. Units in which the identifying unit 12 identifies the form feature and the correction tendency are not limited and, for example, the identifying unit 12 may identify the form feature and the correction tendency in units of forms or may identify the form feature and the correction tendency in units of pluralities of boxes. A description is given below under the assumption that, for example, the identifying unit 12 identifies the form feature and the correction tendency for each box corresponding to an item. Therefore, the OCR recognizing unit 11 associates each item in a form with the result of recognition of a character string entered in a box corresponding to the item and sends the item and the character string recognition result associated with each other to the identifying unit 12 together with an identifier (for example, a number uniquely assigned in the form) for identifying the association. The identifier is assigned on a per box basis and may also be called "box number".

The correction information DB 15 is an example of an accumulating unit that accumulates the form feature and the correction tendency received from the identifying unit 12.

In the correction information DB 15, a form feature table 16 for managing a form feature and a correction to a character string made by the checker of the form and a correction tendency table 17 for managing, for each form feature, a correction tendency for the form are accumulated.

FIG. 3 is a diagram illustrating an example of the form feature table 16, and FIG. 4 is a diagram illustrating an example of the correction tendency table 17.

As illustrated in FIG. 3, in the form feature table 16, on a per-box-of-received-form basis, for example, a dictionary name, a form type, a recognized box position, a recognized box type, the presence of correction, a character string before correction, and a character string after correction are managed in association with one another. Among these, the dictionary name, the form type, the recognized box position, and the recognized box type represent the form feature, and the presence of correction, the character string before correction, and the character string after correction represent a character string correction record.

As the dictionary name, for example, the name of a dictionary to be used to identify a candidate correct expression for the character string is set. The information processing apparatus 10 includes a plurality of dictionaries in each of which, character strings that are likely to be used in a specific type of form are registered. Therefore, when the type of form is identified, a dictionary specific to the type of form is used so that, unlike in a case where dictionaries corresponding to the other types of forms are used, a character string that is likely to be used in the form is presented as a candidate correct expression.

The OCR recognizing unit 11 may cooperate with the identifying unit 12 to tentatively perform an OCR process using, for example, a predetermined dictionary, may send character string recognition results to the identifying unit 12, and thereafter, in a case where the identifying unit 12 identifies a dictionary to be used from the type of form, may redo the OCR process using the identified dictionary. In this case, the character string recognition rate may be higher than in a case where the OCR process is performed using a dictionary other than the dictionary identified by the identifying unit 12.

In the example of the form feature table 16 in FIG. 3, as the dictionary name, "general", "medical", and "alphanumeric" are set. The medical dictionary is a dictionary to be used in a case where a received form is a form relating to medical services, and the alphanumeric dictionary is a dictionary to be used in a case where a received form is a form mainly including alphanumeric character strings. In the medical dictionary, a larger number of character strings to be used in medical services are registered than in the other dictionaries. In the alphanumeric dictionary, English words and numerical characters are registered.

The general dictionary is a dictionary to be used in a case where, for example, a dictionary suitable to a received form is not found.

As the form type, a type of form identified from character string recognition results is set. The type of form is identified from, for example, the title of the form and the names of items.

In the example of the form feature table 16 in FIG. 3, as the form type, "quarterly report", "surgery certificate", "application", and "component inspection sheet" are set. For example, in a case where the tile of a form or the name of an item includes character strings, such as "quarterly" and "report", the form type is identified as "quarterly report" by using an existing natural language analysis technique. Regarding the other forms, the form type is identified by using a similar technique.

As the recognized box position, information for uniquely identifying the box corresponding to an item included in the form is set. The recognized box position is information that is internally used by the identifying unit 12 to identify a form feature and a correction tendency for each box and, for example, a box number assigned by the OCR recognizing unit 11 for the box is set as the recognized box position.

As the recognized box type, the type of information entered in a box indicated by the recognized box position is set. The recognized box type is identified from, for example, the result of recognition of a character string in the box.

In the example of the form feature table 16 in FIG. 3, as the recognized box type, "approval condition", "surgery procedure", "questionnaire", and "component number" are set. For example, in a case where the result of recognition of a character string in a box includes a character string such as " . . . is approved on condition that . . . " indicating that an approval is given in exchange for satisfaction of some condition, the recognized box type is identified as "approval condition" by using an existing natural language analysis technique. For the other examples of the recognized box type, information entered in the box is analyzed by using a similar technique, and the recognized box type is identified.

In the above description, the example case has been described where the information processing apparatus 10 uses an existing natural language analysis technique to identify the form feature from the name of an item or the result of recognition of a character string in a box corresponding to the item; however, the checker of the form may set the form feature.

As the presence of correction, whether the result of recognition of a character string in a box indicated by the recognized box position has been corrected by the checker of the form is set.

As the character string before correction, the result of recognition of a character string in a box indicated by the recognized box position before the character string is corrected by the checker of the form, the result being obtained by the OCR recognizing unit 11, is set. The character string before correction is set also in a case where the character string has not been corrected by the checker of the form.

As the character string after correction, a character string that is part of the result of recognition of a character string in a box indicated by the recognized box position and that is obtained after correction by the checker of the form is set in association with the character string before correction. For example, in a case where the checker of a form corrects a character string in units of words, as the character string after correction, a character string obtained after correction is managed in association with a word before correction. Specifically, in a case where a word "KI-RAI" in kanji is corrected to "KI-MATSU" in kanji, "KI-RAI" and "KI-MATSU" are managed in association with each other. That is, a word after correction is managed so that which word in the character string before correction is corrected to the word after correction is known. A postpositional particle sandwiched between words may be formed of, for example, two or more hiragana characters, and therefore, such a postpositional particle is also referred to as "word" in this exemplary embodiment for convenience of description.

As illustrated in FIG. 4, in the correction tendency table 17, on a per-box-of-received-form basis, for example, a dictionary name, a form type, a recognized box position, a recognized box type, a candidate correct expression, a category, and a candidate selection reason are managed in association with one another. Among these, as the dictionary name, the form type, the recognized box position, and the recognized box type, the corresponding items of the form feature described with reference to the form feature table 16 are set, and the candidate correct expression, the category, and the candidate selection reason are associated with the form feature as a correction tendency for the form.

As the candidate correct expression, a character string that is a candidate correct expression to be displayed for the result of recognition of a character string before correction in a box indicated by the recognized box position is set. Similarly to the character string after correction in the form feature table 16 illustrated in FIG. 3, a character string that is a candidate correct expression is set in association with the character string before correction. When the candidate correct expression is set in units of words, the words are managed in association with words before correction that correspond to the candidate correct expression. The units of a character string that is the candidate correct expression are not limited, and units in characters, units in phrases, or units in clauses may be used in addition to units in words. In accordance with the units of a character string that is the candidate correct expression, the candidate correct expression is managed in association with the character string before correction.

As described above, as the category, the category of the candidate selection reason is set, and as the candidate selection reason, the reason for selecting a character string set as the candidate correct expression as a candidate correct expression for a corresponding character string before correction is set.

In a case where a correction tendency for a form having a form feature the same as the correction tendency of a received form identified by the identifying unit 12 is recorded to the correction tendency table 17, the controller 13 obtains, from the correction information DB 15, the correction tendency associated with the form feature of the received form and controls the UI unit 14 to display, in accordance with the obtained correction tendency, a candidate correct expression for the result of recognition of a character string before correction.

The UI unit 14 displays the check-correction screen 2 illustrated in FIG. 2 to the checker of the form and receives, from the checker of the form, a correction instruction and a check instruction for a character string recognition result obtained by the OCR recognizing unit 11.

Therefore, the UI unit 14 includes an input unit 14A for receiving an instruction from the checker of the form and a display unit 14B for displaying the check-correction screen 2.

The check instruction is an instruction indicating that the checker of the form has confirmed that the character string recognition result is correct and has not made a correction to the character string recognition result. The check instruction and the correction instruction may be hereinafter collectively referred to as "check-correction instruction". The check-correction instruction is given for each specific unit of a form feature and a correction tendency. In a case where a form feature and a correction tendency are identified for each box corresponding to an item as in this exemplary embodiment, the check-correction instruction is given for each box corresponding to an item.

When a check-correction instruction is input to the input unit 14A, the check-correction instruction is sent to the identifying unit 12, and the presence of correction and the character string after correction in the form feature table 16 are set. In a case where a correction has not been made to the character string recognition result, the presence of correction is set to "no", and the character string after correction is left blank.

Now, an example configuration of an electric system in the information processing apparatus 10 will be described.

Figure 5:
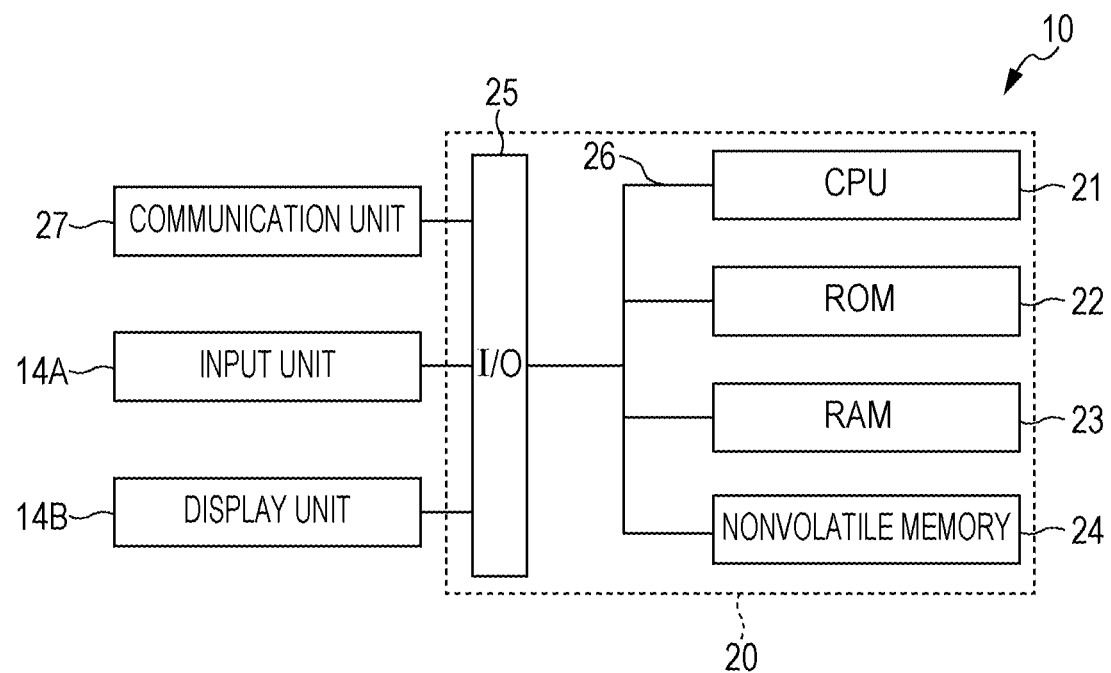
FIG. 5 is a diagram illustrating an example configuration of an electric system in the information processing apparatus.

FIG. 5 is a diagram illustrating an example configuration of the electric system in the information processing apparatus 10. The information processing apparatus 10 is formed of, for example, a computer 20.

The computer 20 includes a central processing unit (CPU) 21, a read-only memory (ROM) 22, a random access memory (RAM) 23, a nonvolatile memory 24, and an input-output interface (I/O) 25. The CPU 21 is an example of a processor that is responsible for the functional units of the information processing apparatus 10. The ROM 22 stores an information processing program for causing the computer 20 to function as the functional units illustrated in FIG. 1. The RAM 23 is used as a temporary work area of the CPU 21. The CPU 21, the ROM 22, the RAM 23, the nonvolatile memory 24, and the I/O 25 are connected to one another via a bus 26.

The nonvolatile memory 24 is an example of a storage device that retains stored information even if power that is supplied to the nonvolatile memory 24 is cut and, for example, a semiconductor memory is used as the nonvolatile memory 24; however, a hard disk may be used. The nonvolatile memory 24 need not be built in the computer 20 and may be a portable storage device, such as a memory card, that is installed in and removed from the computer 20.

To the I/O 25, for example, a communication unit 27, the input unit 14A, and the display unit 14B are connected.

The communication unit 27 is connected to a communication line not illustrated and complies with a communication protocol for performing data communication with external apparatuses connected to the communication line (not illustrated). The information processing apparatus 10 is connected to the scanner optically reading the content of a form, for example, over the communication line (not illustrated) via the communication unit 27 and obtains an image of the form from the scanner over the communication line (not illustrated).

The input unit 14A is a device that receives and sends, to the CPU 21, an instruction from the checker of the form and, for example, a button, a touch panel, a keyboard, and/or a mouse are used as the input unit 14A. In a case where an instruction from the checker of the form is given by voice, a microphone may be used as the input unit 14A.

The display unit 14B is a device that displays information processed by the CPU 21 and, for example, a liquid crystal display or an organic electroluminescence (EL) display is used as the display unit 14B.

Units connected to the I/O 25 are not limited to the units illustrated in FIG. 5, and another unit, such as an image forming unit that forms an image on a recording medium, such as a sheet, may be connected to the I/O 25. In a case where an image of a form is obtained not from the scanner over the communication line (not illustrated) but via a semiconductor memory, such as a memory card or a universal serial bus (USB) memory, the information processing apparatus 10 need not include the communication unit 27.

Now, operations of the information processing apparatus 10 in a case where the checker of a form checks and corrects character string recognition results for the form subjected to an OCR process will be described.

Figure 6:
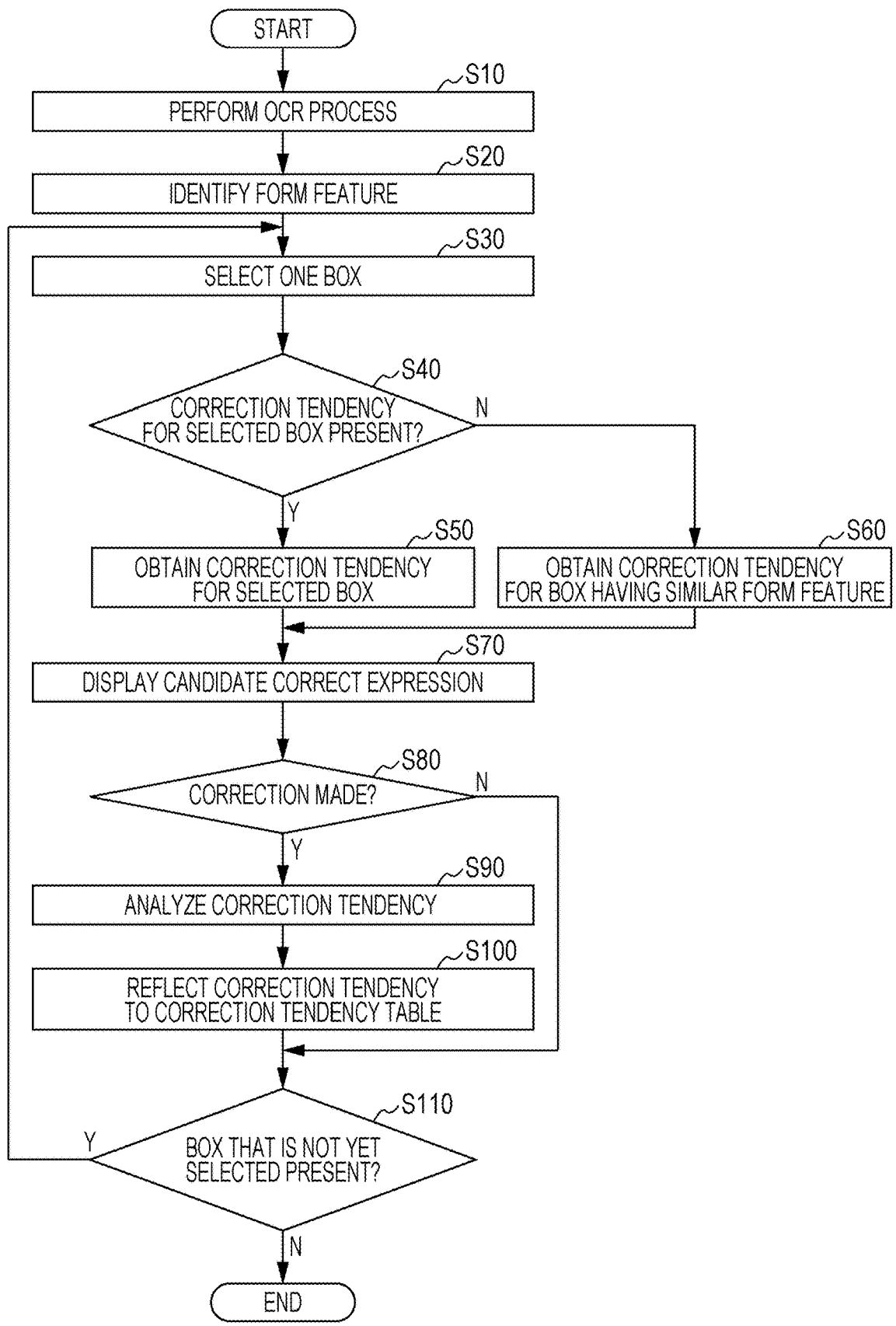
FIG. 6 is a flowchart illustrating an example of a check-correction process.

FIG. 6 is a flowchart illustrating an example of a check-correction process that is performed by the CPU 21 of the information processing apparatus 10 in a case of receiving an image of a form that is a check-correction target. The information processing program for defining the check-correction process is stored in advance in, for example, the ROM 22 of the information processing apparatus 10. The CPU 21 of the information processing apparatus 10 loads the information processing program stored in the ROM 22 and performs the check-correction process.

It is assumed that, in the nonvolatile memory 24 in which the correction information DB 15 is built, the form feature table 16 and the correction tendency table 17 as illustrated in FIG. 3 and FIG. 4 respectively are stored and that the form feature and the correction tendency of each form are stored for each box corresponding to an item. It is preferable that, in the nonvolatile memory 24, for one type of form, a correction tendency for the form learned by checking and correcting 1000 or more forms be accumulated in association with the form feature.

In step S10, the CPU 21 performs an OCR process for a received image of a form and obtains a character string recognition result for each box corresponding to an item included in the form.

In step S20, the CPU 21 uses the character string recognition result for each box corresponding to an item to identify a form feature for each box.

In step S30, the CPU 21 selects one box that is not yet selected from the received form. For convenience of description, the box selected in step S30 is called "selected box".

In step S40, the CPU 21 determines whether a correction tendency for the selected box is present in the correction tendency table 17. A correction tendency for the selected box being present in the correction tendency table 17 refers to a state where a correction tendency is set for a form feature the same as the form feature corresponding to the selected box. In a case where a correction tendency for the selected box is present, the flow proceeds to step S50.

In step S50, the CPU 21 obtains the correction tendency for the selected box from the correction tendency table 17, and the flow proceeds to step S70.

On the other hand, in a case where it is determined in the determination process in step S40 that a correction tendency for the selected box is not present, the flow proceeds to step S60.

In step S60, the CPU 21 obtains, from the correction tendency table 17, a correction tendency associated with a form feature similar to the form feature corresponding to the selected box, and the flow proceeds to step S70. A form feature similar to the form feature corresponding to the selected box being present refers to a state where a form feature including items (in the example in FIG. 4, the dictionary name, the form type, the recognized box position, and the recognized box type) for every one of which content the same as content set for the item in the form feature corresponding to the selected box and identified in step S20 is set is not present but a form feature including the items for at least one of which content the same as content set for the item in the form feature corresponding to the selected box is set is present.

In a case where a plurality of form features that are similar to the form feature corresponding to the selected box are included in the correction tendency table 17, the CPU 21 needs to obtain, from the correction tendency table 17, a correction tendency associated with a form feature including a larger number of items that include features the same as those in the form feature of the selected box than the other form features.

Accordingly, for example, even for a type of form that is received for the first time or for a type of form that has been received in the past but for which the recognized box type is identified as a type different from the previously identified type because of a difference in information entered in the selected box, a correction tendency is obtained from the correction tendency table 17.

In step S70, the CPU 21 controls the display unit 14B to display the check-correction screen 2 on the display unit 14B, the check-correction screen 2 being used to allow the checker of the form to check whether the character string recognition result for the received image of the form is correct and to prompt the checker of the form to make a correction in a case where the character string recognition result is different from the character string entered in the form.

Figure 7:
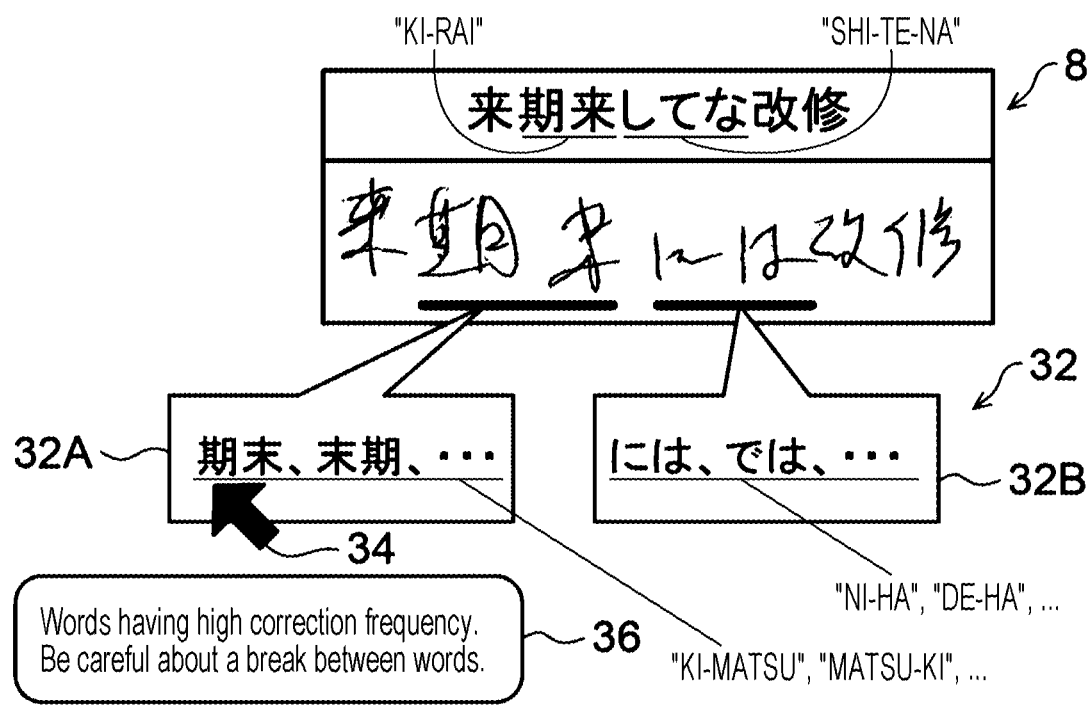
FIG. 7 is a diagram illustrating a first display example of candidate correct expressions.

FIG. 7 is a diagram illustrating a display example displayed in the scanned image/recognition result column 8 of the selected box in a case where, for example, a correction tendency associated with a form feature in the first row of the correction tendency table 17 illustrated in FIG. 4 is obtained. In FIG. 7 and in FIG. 8 to FIG. 10 described below, for convenience of description, an image of a character string in the selected box is displayed in the lower row of the scanned image/recognition result column 8, and a character string recognition result obtained from the image of the character string displayed in the lower row is displayed in the upper row.

The CPU 21 displays an underline for each image portion of the character string, each image portion corresponding to a character string for which a candidate correct expression is set, and displays, for each of the displayed underlines, a balloon 32 indicating a candidate correct expression for the underlined character string, in accordance with the units of the candidate correct expression. Accordingly, as in this exemplary embodiment, in the example case where the candidate correct expression is managed in units of words, each candidate correct expression is displayed in units of words.

In the display example in FIG. 7, for a character string recognized as "KI-RAI" in kanji, a balloon 32A indicating a candidate correct expression including "KI-MATSU" and "MATSU-KI" in kanji is displayed, and for a character string recognized as "SHI-TE-NA" in hiragana, a balloon 32B indicating a candidate correct expression including "NI-HA" and "DE-HA" in hiragana is displayed.

In a case where, for example, the checker of the form moves an instructing object for pointing a selected position on the check-correction screen 2 close to a candidate correct expression as indicated by a mouse cursor 34, the CPU 21 displays the candidate selection reason for the candidate correct expression pointed by the cursor 34 in a pop-up area 36 to thereby provide reference information to the checker of the form so that the character string recognition result is corrected to the original correct character string entered in the box by the filling-out person. In a case where the checker of the form moves the cursor 34 away from the candidate correct expression, the CPU 21 stops displaying the pop-up area 36 indicating the candidate selection reason.

Figure 8:
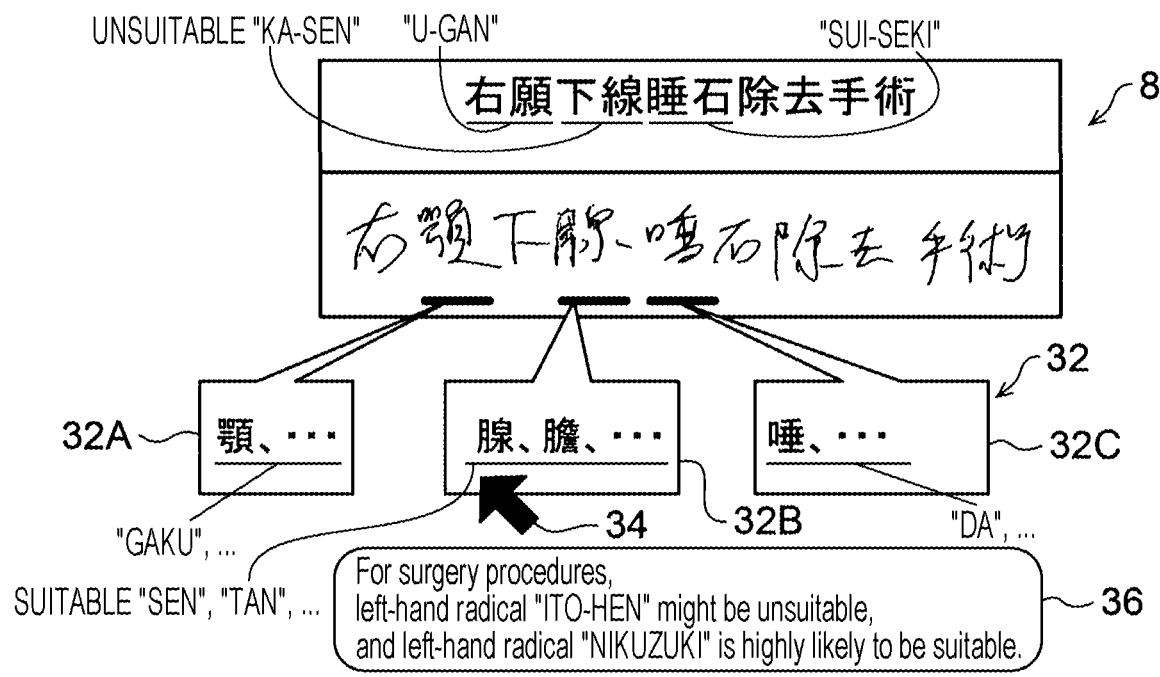
FIG. 8 is a diagram illustrating a second display example of candidate correct expressions.

FIG. 8 is a diagram illustrating a display example displayed in the scanned image/recognition result column 8 of the selected box in a case where, for example, a correction tendency associated with a form feature in the second row of the correction tendency table 17 illustrated in FIG. 4 is obtained.

As described with reference to FIG. 7, the CPU 21 displays an underline for each image portion of the character string, each image portion corresponding to a character string for which a candidate correct expression is set, and displays, for each of the displayed underlines, the balloon 32 indicating a candidate correct expression for the underlined character string.

In the form feature in the second row of the correction tendency table 17 illustrated in FIG. 4, character strings are set as the candidate correct expression as follows: "U-GAKU" in kanji is set for "U-GAN" in kanji, suitable "KA-SEN" in kanji and "KA-TAN" in kanji are set for unsuitable "KA-SEN" in kanji, and "DA-SEKI" in kanji is set for "SUI-SEKI" in kanji. Therefore, the CPU 21 may display underlines for respective portions recognized as "U-GAN", unsuitable "KA-SEN", and "SUI-SEKI" in the image of the character string in the box or may display an underline for only part of a character string that is set as a candidate correct expression, the part having an expression different from the recognized character string.

The display example in FIG. 8 illustrates a case of employing the above-described method for displaying a candidate correct expression. For the character string "U-GAN", an underline is displayed only for a portion recognized as "GAN" that is a difference from the candidate correct expression of "U-GAKU". When the candidate correct expression is displayed, only a character string that is the candidate correct expression and that is different from the recognition result, namely, only "GAKU", is displayed as a candidate correct expression. The same method for display is employed for unsuitable "KA-SEN" and "SUI-SEKI".

In FIG. 8, the cursor 34 points the candidate correct expression for unsuitable "KA-SEN", and therefore, the candidate selection reason for the candidate correct expression for unsuitable "KA-SEN" stating "for a surgery procedure, the left-hand radical "ITO-HEN" might be unsuitable, and the left-hand radical "NIKUZUKI" is highly likely to be suitable" is displayed in the pop-up area 36.

Figure 9:
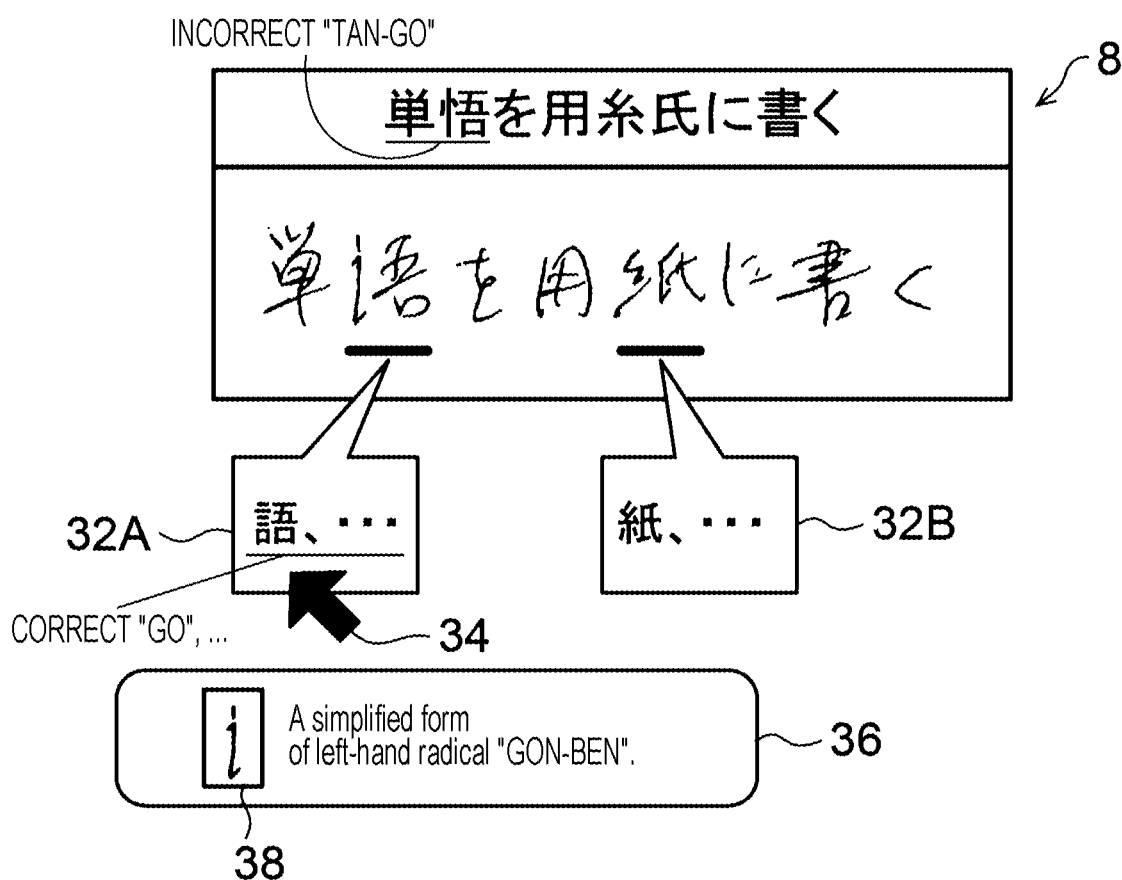
FIG. 9 is a diagram illustrating a third display example of candidate correct expressions.

FIG. 9 is a diagram illustrating a display example displayed in the scanned image/recognition result column 8 of the selected box in a case where, for example, a correction tendency associated with a form feature in the third row of the correction tendency table 17 illustrated in FIG. 4 is obtained. In the display example in FIG. 9, the method of displaying a candidate correct expression that includes only a character string having an expression different from the recognized character string is also employed as in the display example in FIG. 8.

In FIG. 9, the cursor 34 points the candidate correct expression for incorrect "TAN-GO" in kanji, and therefore, the candidate selection reason for the candidate correct expression for incorrect "TAN-GO" stating "a simplified form of the left-hand radical "GON-BEN"" is displayed in the pop-up area 36 together with, for example, a feature of a handwritten character obtained from the image of the corresponding character string. In this case, the CPU 21 may not only display the candidate selection reason set in the correction tendency table 17 but also display supplementary information 38 for supplementing the candidate selection reason in the pop-up area 36. In the display example in FIG. 9, a simplified form of the left-hand radical "GON-BEN" is indicated as the candidate selection reason, and an image of a portion corresponding to the simplified form of the left-hand radical "GON-BEN" in the image of the character string is displayed as the supplementary information 38.

Figure 10:
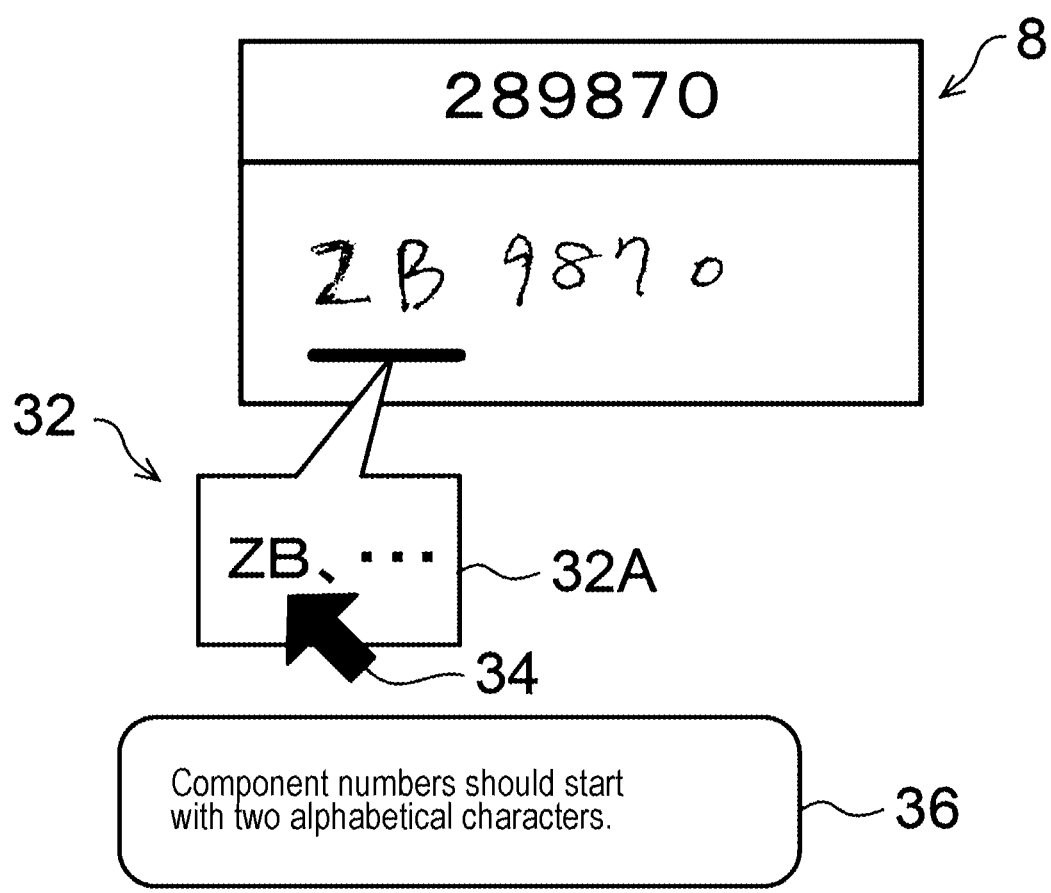
FIG. 10 is a diagram illustrating a fourth display example of candidate correct expressions.

FIG. 10 is a diagram illustrating a display example displayed in the scanned image/recognition result column 8 of the selected box in a case where, for example, a correction tendency associated with a form feature in the fourth row of the correction tendency table 17 illustrated in FIG. 4 is obtained.

In FIG. 10, the first two characters entered in the box are recognized as "28"; however, on the basis of the form feature indicating that a component number is to be entered in the box and on the basis of the result of learning correction tendencies indicating that component numbers start with two alphabetical characters, the candidate correct expression "ZB" is displayed together with the candidate selection reason indicating "component numbers should start with two alphabetical characters".

In a case where the character string recognition result needs to be corrected, the checker of the form selects a candidate correct expression with the cursor 34. Then, the character string before correction is replaced with the selected candidate correct expression, and the correction is completed. After the correction of the character string, the character string recognition result displayed in the scanned image/recognition result column 8 corresponding to the selected box is replaced with the character string after correction. Thereafter, the checker of the form selects a checkbox in the check column corresponding to the selected box on the check-correction screen 2 illustrated in FIG. 2 with the cursor 34 and enters a check mark in the checkbox to notify the CPU 21 that the character string recognition result in the selected box has been checked.

On the other hand, in a case where correction of the character string recognition result is not necessary, the checker of the form enters a check mark in the checkbox in the check column corresponding to the selected box on the check-correction screen 2 without correcting the character string recognition result displayed in the scanned image/recognition result column 8 corresponding to the selected box.

In a case where the displayed candidate correct expressions do not include a suitable or correct candidate correct expression for the character string before correction, the checker of the form needs to rewrite the character string recognition result with a suitable or correct character string.

As described above, after displaying candidate correct expressions for the character string recognition result for the selected box, in step S80, the CPU 21 determines whether a correction has been made to the character string recognition result displayed in the scanned image/recognition result column 8 corresponding to the selected box. In a case where a correction has been made, the flow proceeds to step S90.

In step S90, the CPU 21 associates the character string before correction and the character string after correction with each other and analyzes the correction tendency for the character string, such as the frequency of correction, the tendency of error, a comparison between the features of the handwritten deformed character string and those of the original correct character string, and a field in which the character string after correction is likely to be used, by using an existing data analysis technique.

In step S100, the CPU 21 reflects the correction tendency for the character string analyzed in step S90 to the correction tendency table 17.

In a case where a form feature the same as the form feature corresponding to the selected box is present in the correction tendency table 17, the CPU 21 reflects the correction tendency for the character string analyzed in step S90 to a correction tendency associated with the form feature. On the other hand, in a case where only a form feature similar to the form feature corresponding to the selected box is present in the correction tendency table 17, the CPU 21 adds a new row to the correction tendency table 17 and sets the form feature corresponding to the selected box and the correction tendency for the character string analyzed in step S90 in the added row.

The CPU 21 adds a new row to the form feature table 16 and sets the form feature of the selected box identified in step S20 in the added row, sets the presence of correction in the added row to "yes", and sets the character string before correction and the character string after correction. Then, the flow proceeds to step S110.

On the other hand, in a case where it is determined in the determination process in step S80 that a correction has not been made to the character string recognition result displayed in the scanned image/recognition result column 8 corresponding to the selected box, the CPU 21 adds a new row to the form feature table 16, sets the form feature of the selected box identified in step S20 in the added row, sets the presence of correction in the added row to "no", leaves the character string after correction blank, and sets the character string before correction. Then, the flow proceeds to step S110.

In step S110, the CPU 21 determines whether a box that is not yet selected in step S30 is present in the received form. In a case where a box that is not yet selected is present, the flow returns to step S30. That is, the process from step S30 to step S110 is repeated until all boxes are selected. Accordingly, the character string recognition result in each box corresponding to an item included in the received form is checked and corrected by the checker of the form, and a correction tendency for the character string is analyzed on the basis of the result of correction.

In a case where all boxes corresponding to the respective items included in the form have been selected with the process in step S30, the check-correction process illustrated in FIG. 6 ends.

In the check-correction process illustrated in FIG. 6, a form feature is identified for each box corresponding to an item; however, the CPU 21 may identify a combination feature, which is a form feature obtained by combining form features associated with a plurality of boxes corresponding to respective items, and analyze a correction tendency for a character string recognition result having the combination feature.

For example, in a case where "Human Resources Department" is entered in a box of an item named "Department Name" and a handwritten signature is entered in a box of an item named "Signature Field", the form feature of the department name and the form feature of the signature field are combined to thereby identify a combination feature indicating that, for example, a member of the human resources department having a right to put their signature, that is, the human resources department head, has put their signature in the signature field.

For such a combination feature, a correction tendency for the character string is obtained by referring to a dictionary or the like obtained as a result of preliminary machine learning of difficult-to-read characters handwritten by the human resources department head, and a candidate correct expression corresponding to characters handwritten by the human resources department head is displayed.

For example, a region-specific feature may be found in a handwritten character or the frequency of use of a character string. For example, in Niigata prefecture, a simplified form of "GATA" in kanji is used more frequently than in the other regions. A kanji character "GU" (one of its meanings is "Gushu", which is an old name of a region in Kyushu) has a feature, that is, this kanji character is used in the names of places and the names of persons in Kyushu more frequently than in the other regions.

Therefore, in a case where the address of the filling-out person is entered as an item "Address", a correction tendency regarding the result of recognition of a character string in each box corresponding to an item needs to be analyzed by taking into consideration the place of residence of the filling-out person.

In a case where a received form has a combination feature for which a correction tendency has been analyzed, the correction tendency for a character string associated with the combination feature is obtained, and a candidate correct expression is displayed for the result of recognition of the character string in a box to which the combination feature is applied. In this case, a more suitable candidate correct expression that corresponds to the original character string is presented than in a case of displaying a candidate correct expression obtained from a correction tendency obtained by an analysis using the result of correction to the result of recognition of a character string in a box corresponding to one item.

As described above, with the information processing apparatus 10 according to this exemplary embodiment, a form feature is identified from a character string recognition result for the form and, in accordance with a correction tendency for the character string, the correction tendency being associated with a form feature the same as or similar to the identified form feature, a candidate correct expression for the character string is displayed.

To identify a correction tendency, an existing data analysis technique, such as machine learning or deep learning using AI, is used. Therefore, display of a candidate correct expression inferred from only the similarity between the shapes of characters on a character by character basis is not performed, but a candidate correct expression is displayed in units of words or in units of phrases and the candidate selection reason is presented. That is, a candidate correct expression is displayed by taking into consideration the context of the text. As the length of a character string that is the candidate correct expression increases, the number of corrections becomes smaller than in case of correcting the character string on a character by character basis.

The present disclosure has been described with reference to the exemplary embodiment; however, the present disclosure is not limited to the scope of the exemplary embodiment. Various modifications or improvements may be made to the exemplary embodiment without departing from the spirit of the present disclosure. A form obtained by making such modifications or improvements is within the technical scope of the present disclosure. For example, the order of steps may be changed without departing from the spirit of the present disclosure.

In the exemplary embodiment, for example, the form in which the check-correction process is implemented as software has been described; however, a process equivalent to the flowchart illustrated in FIG. 6 may be installed in, for example, an application-specific integrated circuit (ASIC), a field programmable gate array (FPGA), or a programmable logic device (PLD) so that the hardware performs the process. In this case, processing becomes faster than in the case where the check-correction process is implemented as software.

The CPU 21 may be thus replaced by a dedicated processor specialized in a specific process, such as an ASIC, an FPGA, a PLD, a graphics processing unit (GPU), and/or a floating point unit (FPU).

The operations of the CPU 21 in the exemplary embodiment are implemented by one CPU 21 but may be implemented by a plurality of CPUs 21. Alternatively, the operations of the CPU 21 in the exemplary embodiment may be implemented by cooperative operations between the CPUs 21 in a plurality of computers 20 that are placed in physically separated locations.

In the above-described exemplary embodiment, the form in which the information processing program is installed in the ROM has been described; however, the exemplary embodiment is not limited to this. The information processing program according to the exemplary embodiment of the present disclosure may be recorded to a computer-readable storage medium and provided. For example, the information processing program according to the exemplary embodiment of the present disclosure may be recorded to an optical disc, such as a compact disc (CD)-ROM or a digital versatile disc (DVD)-ROM, and provided. Alternatively, the information processing program according to the exemplary embodiment of the present disclosure may be recorded to a semiconductor memory and provided.

Further, the information processing apparatus 10 may obtain the information processing program according to the exemplary embodiment of the present disclosure from an external apparatus over the communication line not illustrated.

In the embodiments above, the term "processor" refers to hardware in a broad sense. Examples of the processor include general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising
a processor configured to
identify, from a character string recognition result for a form, a form feature that indicates at least a field in which the form is used or an attribute of a filling-out person filling out the form,
accumulate past correction tendencies for character string recognition results for forms having respective identified form features, and
obtain a correction tendency for a form having a form feature that is the same as the identified form feature from among the accumulated correction tendencies, and perform control to display a candidate correct expression for the character string recognition result for the form in accordance with the obtained correction tendency.

2. The information processing apparatus according to claim 1, wherein
the processor is configured to further
identify a form feature for each box of a form in which a character string is entered, and accumulate a correction tendency for a character string recognition result in association with the box of the form as a past correction tendency, and
obtain a correction tendency, for a character string, associated with each box of a form of a type that is the same as a type of a received form, and perform control to display a candidate correct expression for each box of the received form in accordance with the obtained correction tendency.

3. The information processing apparatus according to claim 2, wherein
the processor is configured to further
identify a combination feature inferred by combining form features identified for respective boxes of a form, and accumulate a correction tendency for a character string recognition result for the form having the combination feature as a past correction tendency, and
in a case where the received form has a combination feature, obtain a correction tendency, for a character string, associated with the combination feature from among the accumulated correction tendencies, and perform control to display, in accordance with the obtained correction tendency, a candidate correct expression for a character string in a box with which a form feature used to infer the combination feature is associated.

4. The information processing apparatus according to claim 1, wherein
the processor is configured to further
perform control to display the candidate correct expression that is a character string formed of two or more characters.

5. The information processing apparatus according to claim 2, wherein
the processor is configured to further
perform control to display the candidate correct expression that is a character string formed of two or more characters.

6. The information processing apparatus according to claim 3, wherein
the processor is configured to further
perform control to display the candidate correct expression that is a character string formed of two or more characters.

7. The information processing apparatus according to claim 4, wherein
the processor is configured to further
perform control to display the candidate correct expression in units of words.

8. The information processing apparatus according to claim 5, wherein
the processor is configured to further
perform control to display the candidate correct expression in units of words.

9. The information processing apparatus according to claim 6, wherein
the processor is configured to further
perform control to display the candidate correct expression in units of words.

10. The information processing apparatus according to claim 1, wherein
the processor is configured to further
perform control to display a reason for displaying the candidate correct expression.

11. The information processing apparatus according to claim 2, wherein
the processor is configured to further
perform control to display a reason for displaying the candidate correct expression.

12. The information processing apparatus according to claim 3, wherein
the processor is configured to further
perform control to display a reason for displaying the candidate correct expression.

13. The information processing apparatus according to claim 4, wherein
the processor is configured to further
perform control to display a reason for displaying the candidate correct expression.

14. The information processing apparatus according to claim 5, wherein
the processor is configured to further
perform control to display a reason for displaying the candidate correct expression.

15. The information processing apparatus according to claim 6, wherein
the processor is configured to further
perform control to display a reason for displaying the candidate correct expression.

16. The information processing apparatus according to claim 7, wherein
the processor is configured to further
perform control to display a reason for displaying the candidate correct expression.

17. The information processing apparatus according to claim 8, wherein
the processor is configured to further
perform control to display a reason for displaying the candidate correct expression.

18. The information processing apparatus according to claim 9, wherein
the processor is configured to further
perform control to display a reason for displaying the candidate correct expression.

19. A non-transitory computer readable medium storing an information processing program causing a computer to execute a process, the process comprising:
identifying, from a character string recognition result for a form, a form feature that indicates at least a field in which the form is used or an attribute of a filling-out person filling out the form;
accumulating past correction tendencies for character string recognition results for forms having respective identified form features; and
obtaining a correction tendency for a form having a form feature that is the same as the identified form feature from among the accumulated correction tendencies, and performing control to display a candidate correct expression for the character string recognition result for the form in accordance with the obtained correction tendency.

20. An information processing apparatus comprising:
means for identifying, from a character string recognition result for a form, a form feature that indicates at least a field in which the form is used or an attribute of a filling-out person filling out the form;

means for accumulating past correction tendencies for character string recognition results for forms having respective identified form features; and means for obtaining a correction tendency for a form having a form feature that is the same as the identified form feature from among the accumulated correction tendencies, and performing control to display a candidate correct expression for the character string recognition result for the form in accordance with the obtained correction tendency.

* * * * *